United States Patent [19]
Matoba

[11] Patent Number: 4,562,890
[45] Date of Patent: Jan. 7, 1986

[54] APPARATUS FOR WARMING WINDOW WASHER LIQUID FOR A MOTOR VEHICLE

[75] Inventor: Nobushige Matoba, Osaka, Japan

[73] Assignee: Matex Co., Ltd., Osaka, Japan

[21] Appl. No.: 554,494

[22] Filed: Nov. 22, 1983

[51] Int. Cl.$^4$ .......................... B60H 1/06; F28D 7/10
[52] U.S. Cl. ................................ 165/41; 237/12.3 R; 237/12.3 B; 165/156; 165/169
[58] Field of Search ...................... 237/12.3 R, 12.3 B; 219/202, 203; 62/239; 122/20 B; 165/41, 156, 169, 76

[56] References Cited

U.S. PATENT DOCUMENTS

| | | | |
|---|---|---|---|
| 3,021,690 | 2/1962 | Kroger | 62/239 X |
| 3,793,992 | 2/1974 | Marquez | 122/20 B |
| 3,888,412 | 6/1975 | Lindo | 237/12.3 B |
| 4,354,548 | 10/1982 | Carlsson | 165/41 |

FOREIGN PATENT DOCUMENTS 80958  6/1980  Japan .

Primary Examiner—Henry Bennett
Attorney, Agent, or Firm—Griffin, Branigan & Butler

[57] ABSTRACT

A window washer system for a motor vehicle is disclosed wherein means are provided for warming the window washer liquid. The window washer system includes a tank (5) for storing window washer liquid, a washer liquid pump (6), washer liquid hoses (7), a flexible heat exchanger tube (8) wound around an engine coolant hose (3), and window nozzles (10). As washer liquid is pumped through flexible heat exchanger tube (8), the washer liquid is warmed by heat conducted from hot engine coolant through the walls of coolant hose (3) and through the walls of heat exchanger tube (8). The heat exchanger tube (8) is connected by coupling elements (9) to the washer liquid hoses (7) in line between the washer liquid pump (6) and the window nozzles (10). The heat exchanger tube (8) is preferably made from a thermoplastic material such as nylon. An ear (15) may project from the side of the coupling element (9). The ear (15) has a small slit (16). A tie belt (17) passes through the slit (16) and wraps around the coolant hose (3). When the tie belt (17) is fastened, it secures both the heat exchanger tube (8) and the coupling element (9) to the engine coolant hose (3).

1 Claim, 9 Drawing Figures

APPARATUS FOR WARMING WINDOW WASHER LIQUID FOR A MOTOR VEHICLE

BACKGROUND OF THE INVENTION

This invention relates to an apparatus for warming the washer liquid in an automobile, truck, bus, or other motor vehicle window washer system. More specifically, the invention relates to devices for warming the window washer liquid by using a heat source deriving heat from the motor vehicle engine.

Window washer liquid is used to clean dirt adhering to the front window glass of automobiles, trucks, buses, and other motor vehicles. Both chemical and physical action may be employed in the cleaning operation. For example, as a liquid solvent providing chemical action is squirted onto the front window glass, the blades of the windshield wiper simultaneously scrape the glass providing physical action.

The window washer liquid is often water alone or mixtures of water and detergent. The cleaning performance of a water-based washer liquid decreases as the liquid temperature is reduced. A higher temperature would improve the cleaning performance of the washer liquid. However, an excessively hot washer liquid would be dangerous because it may be the cause of someone being burned. The optimum range of the temperature of the window washer liquid is from 40° C. to 70° C.

In summer, the temperature of the washer liquid in motor vehicles is generally in the optimum range. However, in winter, the temperature of the washer liquid is generally lower than the optimum temperature range.

There are known devices which utilize automobile engine heat for warming the window washer liquid. In one type of prior art apparatus for warming up washer water, a heat exchanger is installed upon an exhaust pipe through which hot engine gases are discharged from the engine.

In the apparatus described in Japanese Utility Model Publication No. 53-34662/1978, window washer liquid is warmed by heat conducted from engine cooling water and by heat conducted by contacting the washer liquid pipe with an engine exhaust pipe.

In the apparatus described in Japanese Utility Model Publication No. 52-6978/1972, a washer liquid pipe is wound around the outer surface of the muffler for hot engine exhaust gases, and the washer liquid is heated by the heat conducted through the muffler and the pipe. This apparatus also provides withdrawal of residual liquid to a washer liquid tank.

The apparatus described in Japanese Utility Model Publication No. 52-34757/1977 employs a spirally formed copper pipe which is contacted with the outer surface of an engine exhaust pipe. Washer liquid flows through the spiral copper pipe. Efficient heat exchange occurs because the area in which the spiral copper pipe and the exhaust pipe are in contact is large.

The apparatus described in Japanese Utility Model Publication No. 53-41864/1978 has a heat exchanger with a half-cylindrical shape secured in close contact with the outer surface of an engine exhaust pipe. Also disclosed is the use of a valve arrangement to return the washer liquid heated to the boiling point back into a washer liquid holding tank.

The apparatus described in Japanese Utility Model Publication No. 53-52753/1978 makes use of a heat exchange casing made from metal mounted upon the outer surface of an engine exhaust pipe. In the heat exchange casing a fluid passage meanders. Washer liquid is heated as it flows through the fluid passage. Cooling fins are formed upon the upper surface of the heat exchange casing to prevent washer liquid from boiling.

The apparatus described in Japanese Utility Model Laying Open No. 57-151147/1982 also uses a heat exchanger which is mounted on an engine exhaust pipe in order to heat up washer liqud.

The main purpose of the apparatus in which window washer liquid is heated by heat derived from hot engine exhaust gas is to heat and melt snow, frost or ice which accumulates on the front window of the automobile. These apparatus are not designed to enhance the cleaning performance of the washer liquid.

For melting ice or snow, it is desirable that the washer liquid be very hot. Thus, in these apparatus a heat exchanger is mounted on the engine exhaust pipe, and the washer liquid is heated by the heat conducted from the hot exhaust gases. The temperature of exhaust gases is about 250° C. to 300° C. The outer surface of an engine exhaust pipe is as hot as the exhaust gases. At this temperature, if the washer liquid stagnates, it may be overheated to the boiling point. In order to avoid such a dangerous situation, it is necessary to constantly withdraw the heated liquid to a storage tank and re-circulate the stored liquid from the tank to the exhaust pipe. These apparatus need a complicated circulation device. In these apparatus the temperature of washer liquid reaches 80° C. to 100° C. This is an excessively high temperature for enhancing the cleaning performance of the window washer liquid. Such hot washer liquid also poses a danger to personnel. Furthermore, with this type of apparatus heat exchanger must be resistant to the high temperature. If the heat exchanger is a pipe wound around an exhaust pipe, the heat exchanger may be a copper pipe. If the heat exchanger is a hollow metallic plate, it may be made from aluminum or brass. Thus, the apparatus which utilize the heat contained in the hot engine exhaust gases need a metallic heat exchanger and a device for constantly circulating the washer liquid to avoid boiling.

In a second type of prior art apparatus for heating up window washer liquid, an independent washer liquid heater is employed.

The apparatus described in Japanese patent laying open No. 57-99439/1982 has an independent electric heater installed to heat washer liquid. The heater does not heat the liquid continuously. When a switch for ejecting washer liquid is actuated, the heater is switched on. This system is not subject to the danger of abrupt boiling. However, a large electric current need flow through the heater coil in order that the heater heat up the washer liquid instantly. Nevertheless, even if a relatively large current flows through the heater coil, actual heating may be insufficient because the Joule heat generated by the electric current is inefficient. Such a system wastes gasoline excessively and is therefore uneconomical.

The apparatus described in Japanese Utility Model Laying Open No. 57-151146/1982 also warms the washer liquid by an additional heater.

The main purpose of these apparatus is to melt ice or snow piled upon a front window of an automobile. This is a problem when an engine is just started after it has cooled down after being stopped for a period of time. It may be unavoidable at this time to use an additional heater because the engine is cold at starting.

Apparatus requiring an additional heater to warm the washer liquid are undesirable, uneconomical, and waste large amounts of electric power and gasoline.

Another prior art approach for cleaning front windows of automobiles involves the use of steam. With this method, water is a main component of window washer liquid. Liquid water cannot be heated above 100° C. at atmospheric pressure and remain a liquid. At 100° C. when washer water is further heated, it is converted to steam.

The apparatus described in Japanese Utility Model Laying Open No. 58-20953/1983 utilizes the engine cooling liquid as the washer liquid. A part of the engine cooling liquid is ejected onto the front window as steam. Vapor of the cooling water is pressurized in the cooling system. Pressurized vapor is cooled and liquefied in the radiator; then the liquefied cooling water is used to cool the engine. The cooling water cools the engine not only by the specific heat of water in the liquid state but also by the evaporation heat to convert liquid water to gaseous steam. In the cooling cycle, hot pressurized steam is generated. This apparatus ejects steam onto the front window. This apparatus requires a specific predetermined construction of the automobile. Furthermore, window washer steam is dangerous; the temperature of pressurized steam is more than 100° C. The washer water need not be as hot as steam.

In another type of prior art apparatus for warming window washer liquid, the washer liquid is heated by a heat exchange with the engine cooling system liquid.

The apparatus described in Japanese Utility Model Publication No. 49-28656/1974 employs a storage tank and a second tank with an inner third tank in the circuit of the engine cooling water. Washer liquid is introduced into the inner tank and is warmed therein by cooling water in the second tank. To install this apparatus, a cooling water hose having a capacity of about one liter must be cut for connecting with the heating tank. A hose for washer liquid must also be cut to connect with the inner tank. Another problem with this apparatus is where and how the heating tank is placed in the space under the hood of the automobile. Heat exchange efficiency is good because a metallic double tank is used. However, the second tank is too expensive and too bulky. Furthermore, a large diameter pipe or hose must be used for the cooling water. Such an apparatus cannot easily be mounted under the hood in an already assembled automobile.

The apparatus described in Japanese Utility Model Publication No. 51-13295/1976 (publication date Apr. 27, 1976) warms window washer liquid and prepares warm drinking water by utilizing the heat contained in the engine cooling water. A large heat exchanger has engine cooling water flowing therethrough. Housed in the heat exchanger are two meandering pipes which carry window washer water and drinking water. While flowing through the respective two meandering pipes, washer liquid and drinking water are warmed. Because this apparatus requires the large heat exchanger to be installed in the engine cooling water system, the apparatus must be installed during original assembly of the automobile. The problems about space under the hood and about the piping must be considered at the design stage for planning the assembly of the automobile. Like other prior art, this apparatus is too bulky to be installed in an already assembled automobile. The main purpose of this apparatus is to warm water for drinking.

The apparatus described in Japanese Utility Model Laying Open No. 57-17850/1982 (date for laying open Jan. 29, 1982) has an engine cooling water pipe with an adaptor for receiving a window washer liquid tank therein. Because the outer surface of the washer liquid tank contacts the hot engine cooling water, the washer liquid in the tank is warmed. The heat exchange efficiency is good because nearly the entire tank is surrounded by the hot engine cooling water. The adaptor in the cooling water pipe must be installed during manufacturing the automobile. It is difficult to add the apparatus on an already assembled automobile. Another problem with this apparatus is the added expense resulting from the use of a double-shelled tank. Another problem is the onset of pressure loss in the cooling water.

The apparatus described in Japanese Patent Laying Open No. 58-53549/1983 (date for laying open, Aug. 30, 1983) has a large tank in the cooling system for the engine. The window washer liquid is heated by the hot cooling water in the large tank. A heat-insulating material envelops the tank to help retain heat. Because the heat-insulating material inhibits the temperature of the washer liquid in the tank from lowering, warm washer liquid can be ejected very close to the time the automobile is started. However, like the other prior art, this apparatus is also bulky and expensive. Furthermore, the large heat exchanger enveloped by the heat-insulating materials requires a large space under the hood for installation. This apparatus must be installed during manufacturing the automobile; it is very difficult to add it onto an already assembled automobile.

The apparatus described in Japanese Patent Laying Open No. 58-12854/1983 (date for laying open, Jan. 25, 1983) has a big rubber hose connecting an engine with a radiator. A spiralled copper pipe, through which the washer liquid flows, is inserted into the big rubber hose. The washer liquid is warmed in the spiralled copper pipe and returns into a tank and is accumulated therein. The purpose of the apparatus is to remove snow and ice from the front window when starting the car. The engine is cold, and the cooling water is cold at starting time. Warm washer liquid which was heated during the previous driving and was accumulated in the tank is ejected at the next starting time.

This apparatus requires a big rubber hose and a spiralled copper pipe to form a heat exchanger. The heat exchange performance is poor because the washer liquid is constantly being circulated between the tank and the heat exchanger. Furthermore, an additional pump is required for circulation of the washer liquid. Although the washer liquid in the tank is strongly heated and becomes very hot during driving, the washer liquid loses most of the heat when the engine is off. Chilled washer liquid is ejected onto the front window when starting the engine after the engine has been off for a considerable length of time. This apparatus brings about little effect on enhancement of cleaning performance of the liquid washer.

An additional problem is present and relates to an effective seal between the copper pipe and the holes of the hose through which the pipe passes. Furthermore, this apparatus requires a costly double-walled tank vessel of stainless steel, for example, to enhance the property of retaining heat in the tank.

The apparatus described in Japanese Utility Model Laying Open No. 57-5348/1982 (date for laying open, Jan. 12, 1982) has a heat exchange cylinder inserted into an engine cooling water hose which connects the engine with the radiator. A metallic spiralled pipe containing window washer liquid is inserted into the heat exchange cylinder. The heat exchange cylinder is a metallic cylinder, on both sides of which joint projections are provided. The ends of the cooling water circulating hose are attached to the joint projections. In the sidewalls an inlet hole and an outlet hole for the spiralled pipe are also provided. Ends of the washer liquid hose are affixed to the projecting ends of the spiralled pipe. The spiralled pipe is made from aluminum or copper.

This apparatus may be added onto an already assembled car. However, the heat exchange cylinder is bulky. It is difficult to install this apparatus into a narrow space under the hood. To secure the metallic heat exchange cylinder to the car body, one must perforate screw holes or must weld the cylinder to the body. It is not practical to secure the heavy cylinder by some adhesive agent. One must partly rearrange the components of the car under the hood in order to install this apparatus.

After securing the heat exchange cylinder to the car body, one must cut the cooling water hose and the window washer water hose, and one must connect the ends of the hoses with the projecting inlets and outlets of the heat exchange cylinder. Furthermore, the heat exchange cylinder itself is costly.

A review of the prior art leads to the following conclusions. Generally, the prior art apparatus have complex construction with many parts and are expensive. They cannot readily be installed in an already assembled car. They require insertion of a new heat exchanger into an engine cooling water circulating hose. The heat exchange with the window washer liquid is generally done by inserting a spiralled metal pipe into the engine cooling water.

Because the temperature of the cooling water for an engine is nearly 80° C. to 90° C., hot window washer liquid at about 70° C. is easily obtained when the washer liquid passes through a spiralled pipe in contact with the engine cooling water. However, because the spiralled pipe is immersed in hot cooling water, the pipe must be both chemically resistant and physically resistant to heat. Therefore, the spiralled pipe must be made from copper or aluminum.

During routine operation of an automobile, window washer liquid is not used at all times. It is ejected intermittently to clean the front window glass. A quantity of washer liquid generally sufficient for cleaning a front window is about 10 cm$^3$. Therefore, it is sufficient that merely several times 10 cm$^3$ of washer liquid be kept warm for an ordinary use. It is unnecessary and wasteful of energy to heat the entire contents of the washer liquid tank. Moreover, the temperature of the washer liquid need not be more than 80° C.

The prior art apparatus described herein are primarily aimed at removing ice, frost or snow from the front window and to do so they must eject hot washer liquid. However, for a different purpose, namely to heighten the chemical activity of the washer liquid and to enhance cleaning performance, it is not necessary to provide such hot washer liquid.

Accordingly, it is a primary object of the present invention to provide an apparatus for warming and not excessively heating window washer liquid for cleaning the front window of a motor vehicle by employing heat from the engine cooling water.

Another advantage of the present invention is that the structure is simple.

Another advantage of the present invention is that installation of the apparatus is easily accomplished.

Another advantage of the present warming apparatus is that it occupies relatively little space under the hood and is inexpensive to make and use.

SUMMARY OF THE INVENTION

A warming apparatus for a window washer system for a motor vehicle is provided. A motor vehicle window washer system generally has a washer liquid tank, a pump, hoses for washer liquid, and window nozzles for directing the washer liquid onto the front window. In accordance with the invention, a flexible heat exchanger tube is wound around an engine coolant hose. Coupling elements are used to connect the heat exchanger tube to the washer liquid hoses in line between the washer liquid pump and the window nozzles.

Preferably, the heat exchanger tube is made from a thermoplastic material such as nylon.

Each of the coupling elements used to connect the ends of the heat exchanger tube to the washer liquid hoses may have an ear projecting from one side of the coupling element. The projecting ear has a slit, and a tie belt passes through the ear slit and is wrapped around the engine coolant hose and fastened. In this way, the fastened tie belt secures both the heat exchanger tube and the coupling element to the engine coolant hose.

In accordance with another aspect of the invention, a method for making and installing a flexible heat exchanger tube is provided. In the method, a straight tube is first wound into a spiral shape on a cylindrical core of smaller outer diameter than the outer diameter of the engine coolant hose around which the heat exchanger tube is to be installed. The spiral wound coil and core are then heated. The spiral wound tube and core are cooled, and thereby the coil shape of the heat exchanger tube is fixed. The cylindrical core is then removed. The spiral tube is then wound onto the engine coolant hose by unwinding the preformed spiral tube. Because the internal diameter of the preformed spiral tube is smaller than the outer diameter of the coolant hose, when the spiral tube is wound onto the coolant hose, the tube fits around the coolant hose with a tight tension fit.

BRIEF DESCRIPTION OF THE DRAWINGS

The foregoing and other objects, features, and advantages of the invention will be apparent from the more specific description of preferred embodiments of the invention, as illustrated in the accompanying drawings in which reference characaters refer to the same parts throughout the different views. The drawings are not necessarily to scale, emphasis instead being placed upon illustrating principles of the invention in a clear manner.

DETAILED DESCRIPTION OF THE INVENTION

Figure 1:
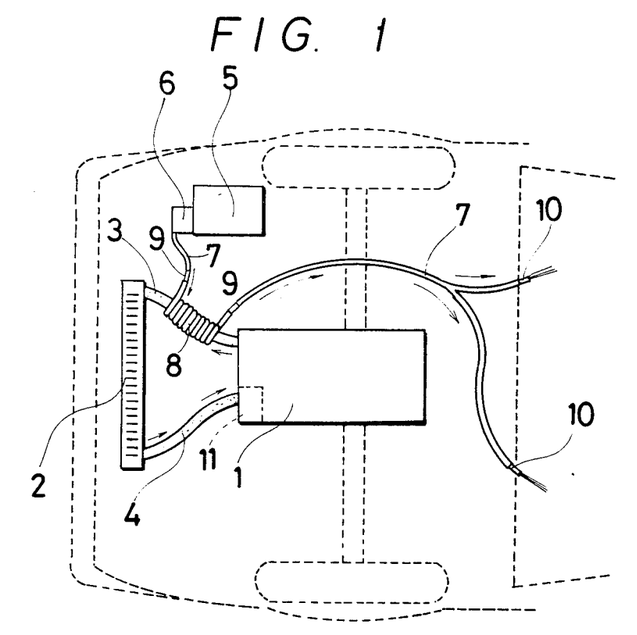
FIG. 1 is a plan view of an embodiment of the invention installed under the hood of an automobile.
Figure 2:
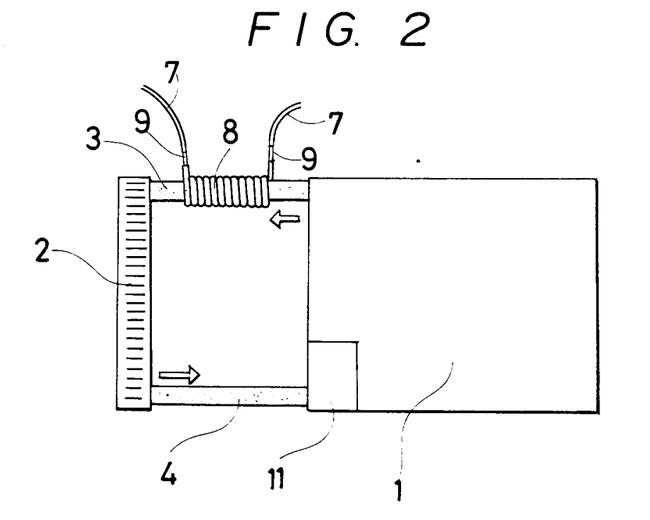
FIG. 2 is a close-up view of the heat exchanger in the embodiment of the invention shown in FIG. 1.

Reference is made to FIG. 1 which shows an engine 1 connected with a radiator 2 by two engine cooling water circulating hoses 3 and 4. Cooling system water is heated in the engine 1, flows through first cooling water circulating hose 3, and is cooled in the radiator 2. The cooled water passes through second cooling water hose 4 and returns to the engine 1.

Washer liquid flows from a washer liquid tank 5 through a washer liquid hose 7 by the action of a washer liquid pump 6 connected between the tank 5 and one end of the hose 7.

Ordinarily in a prior art device the other end of the washer liquid hose 7 is equipped with washer liquid ejecting nozzles 10 in the proximity of a front window of the automobile, and the hose runs directly from the pump to the nozzles. However, with the invention, a heat exchanger tube 8 is installed in line with the washer liquid hose 7 between the pump 6 and the nozzles 10. Hose couplings 9 connect the heat exchanger tube 8 with the washer liquid hose 7.

A standard engine cooling water pump 11 circulates the cooling water through the hose 3, the radiator 2, and the hose 4 in succession.

Washer liquid pump 6 controls flow of the washer liquid from the washer liquid tank 5 into the washer liquid hose 7 and causes washer liquid to remain in the heat exchanger tube 8 thereby permitting the washer liquid to be warmed. The warmed washer liquid is then pumped through the remainder of the washer liquid hose 7 and is ejected from nozzles 10 onto the front window glass.

Figure 3:
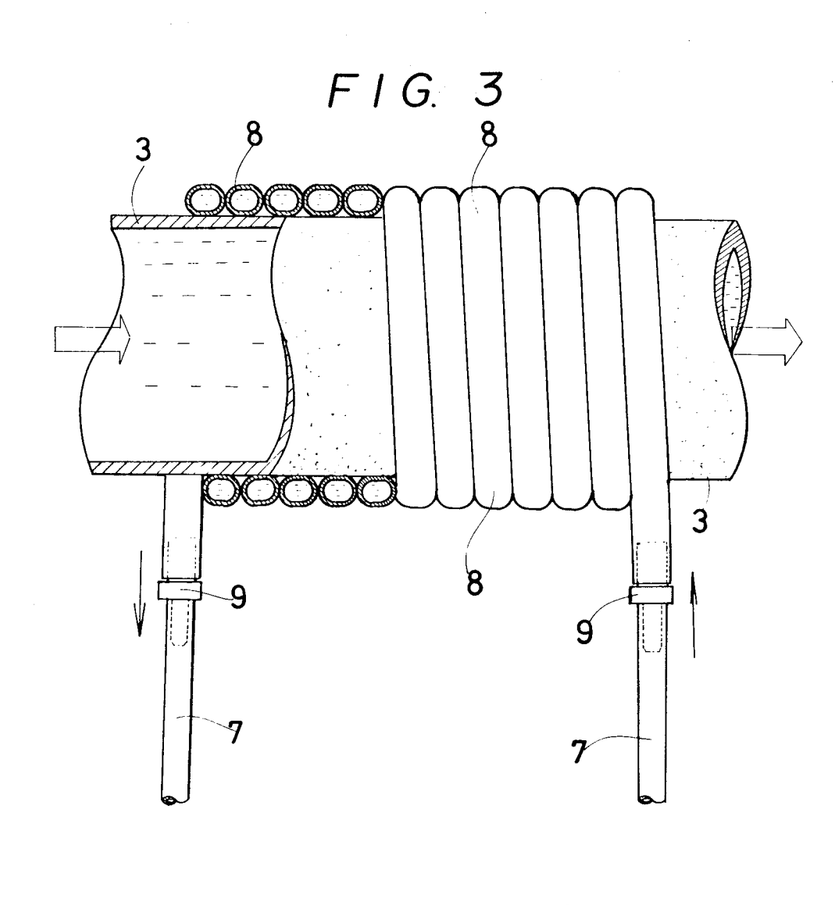
FIG. 3 is a partially sectioned front view of a heat exchanger tube of the invention wound around the outer surface of an engine cooling water circulating hose.

FIG. 3 is a partially sectioned front view of the heat exchanger hose 8 of the invention wound around the outer surface of the cooling water circulating hose 3.

Figure 4:
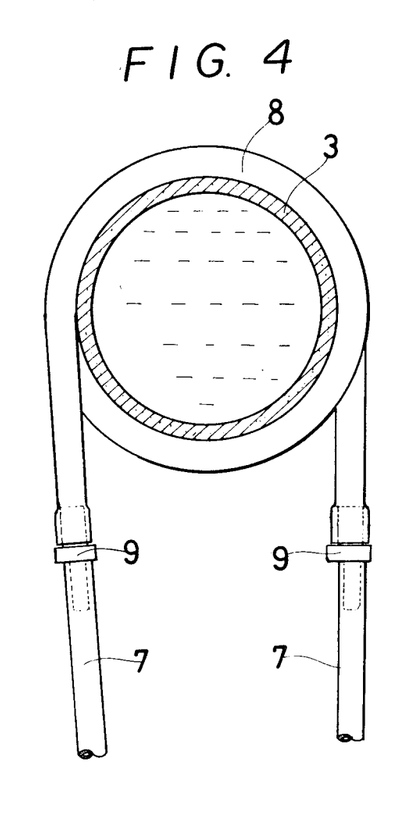
FIG. 4 is a cross-sectional view of the embodiment shown in FIG. 3.

FIG. 4 is a cross-sectional view of the same embodiment of the invention shown in FIG. 3.

Figure 5:
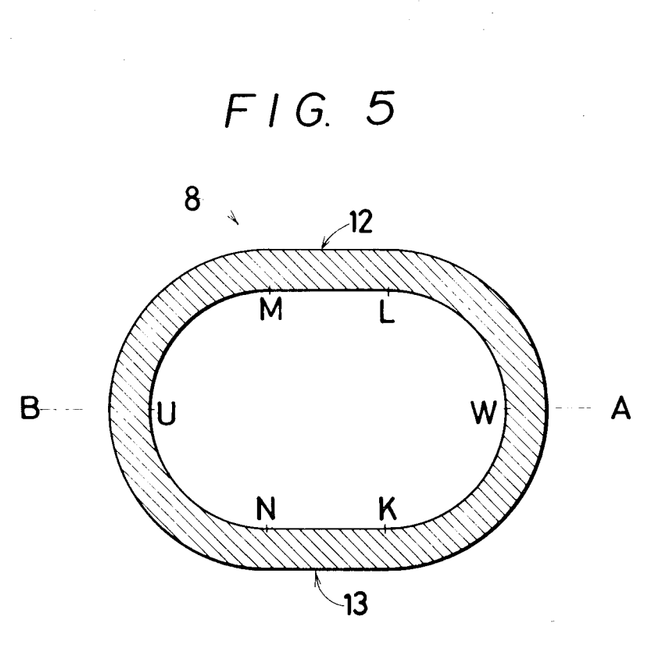
FIG. 5 is an enlarged cross-sectional view of a heat exchanger tube having an elongated-circle-shaped cross-section.

FIG. 5 is an enlarged cross-sectional view of the heat exchanger tube 8 having an elongated circle-shaped cross-section. The heat exchanger tube 8 is made from a flexible plastic. It is not a metal pipe such as a copper pipe or an aluminum pipe.

In a free tube 8 which is not wrapped around a coolant hose 3, outer half side 12 and inner half side 13 of the tube 8 are symmetric with respect to the reference line AB. The outer half side 12 is the part of the tube 8 which faces outward when the heat exchanger tube 8 is wound in a coil around a coolant hose 3. The outer half side 12 does not contact the cooling water circulating hose 3.

The inner half side 13 is the portion which contacts the cooling water circulating hose 3. Although both sides 12 and 13 are symmetrical in a free state, the inner side 13 may be distorted slightly by a strong stress when the spiralled tube 8 is wound around the hose 3.

In use, a flexible, plastic heat exchanger tube 8 having a circular or an elongated-circular sectional shape is wound around the outer surface of an engine cooling water circulating hose 3 which connects the engine 1 with the radiator 2. Couplings 9 are used for connecting the heat exchanger tube 8 with washer liquid hose segments 7. Washer liquid flows from a tank 5 through one washer liquid hose 7, through heat exchanger tube 8, and through another washer liquid hose 7 to washer liquid ejecting nozzles 10.

The coiled heat exchanger tube 8 is manufactured from a flexible plastic material according to the following method. First a long straight tube 8 with a circular or an elongated-circular sectional shape is produced by an extrusion process. Next the long straight tube 8 is wound on a cylindrical core (not shown) into a spiral shape and then heated. The spiral wound tube is then cooled, and thereby the coil shape of the tube is fixed. Tube 8 coil is then separated from the core.

Preferably, the inner diameter of the tube 8 coil is slightly smaller than the outer diameter of the cooling water circulating hose 3 around which the tube coil 8 is to be installed. The tube coil 8 is cut to a length corresponding to the size of the heat exchanger.

The cross-sectional shape of the heat exchanger tube 8 may be a circle or an elongated circle. The elongated circle is a distorted circle comprising two semicircles KL, MN and two straight sides NK, ML connecting the semicircles as shown in FIG. 5.

Figure 7:
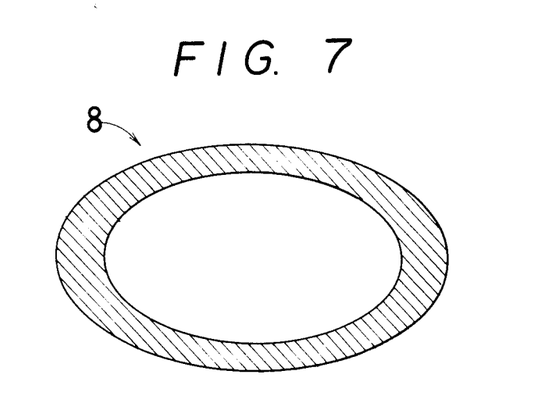
FIG. 7 is an enlarged cross-sectional view of a heat exchanger tube having an elliptical shaped cross-section.
Figure 8:
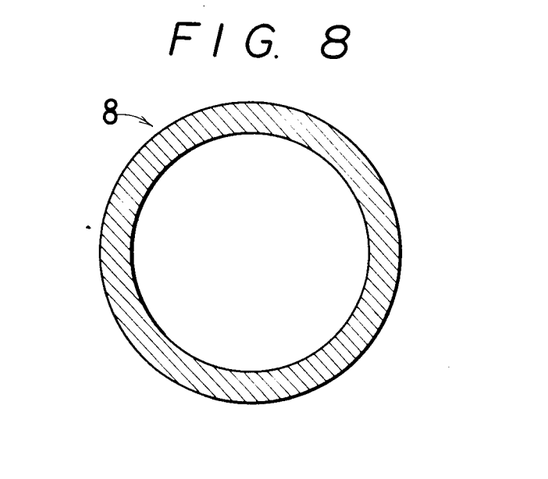
FIG. 8 is an enlarged cross-sectional view of a heat exchanger tube having a circular shaped cross-section; and, FIG. 9 is an enlarged partial front view of a heat exchanger tube showing a coupling element fixed by a tie belt.

The elongated circle cross-sectional shape of tube 8 may also be elliptical as shown in FIG. 7.

The cross-sectional shape of the heat exchanger tube 8 is a circle or an elongated circle when not installed on a hose 3, but the outer side 12 and the inner side 13 may be distorted slightly inwardly by the effects of pressure and heat upon a tube 8 which is wound on the hose 3. Such a slightly-distorted cross-sectional shape is also deemed herein to be in the shape of a circle or an elongated circle.

After the heat exchanger tube 8 is wrapped around the engine cooling water hose 3, tube 8 gradually shrinks and more tightly contacts and adheres to hose 3. This happens because the tube 8 is made from thermoplastic material. With tighter contact, the heat conduction efficiency improves.

The material forming the heat exchanger tube 8 is a thermoplastic with suitable heat resistance. For example, 6 - nylon or 12 - nylon are most preferred. Other suitable materials for forming the heat exchanger tube 8 include polyethylene, polypropylene, and polyvinylchloride.

The pipe couplings are short plastic or metallic pipes for connecting the heat exchanger tube 8 with the washer liquid hose 7 segments. Shape, structure, size and material of fabrication of the couplings 9 are selected to fit both the heat exchanger tube 8 and the washer liquid hoses 7.

Figure 6:
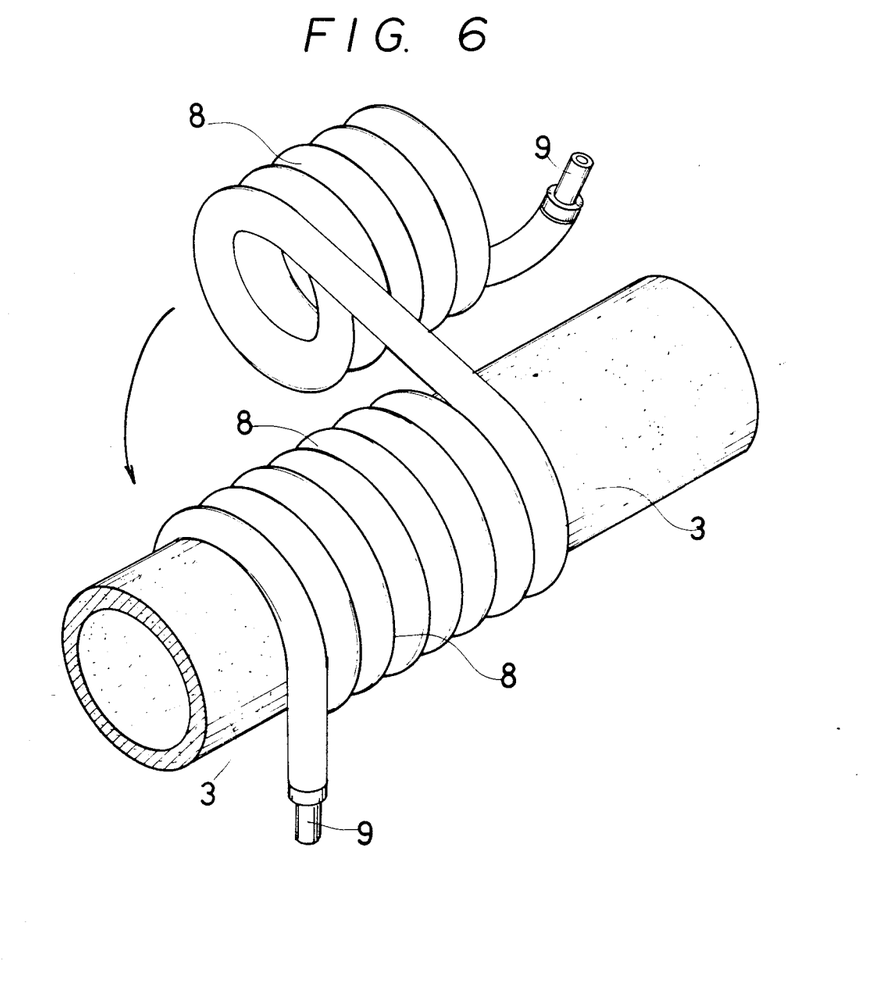
FIG. 6 is a perspective view of a heat exchanger tube of the invention in the process of being wound around the engine cooling water circulating hose.

FIG. 3, FIG. 4, and FIG. 6 show examples of simple couplings 9.

Figure 9:
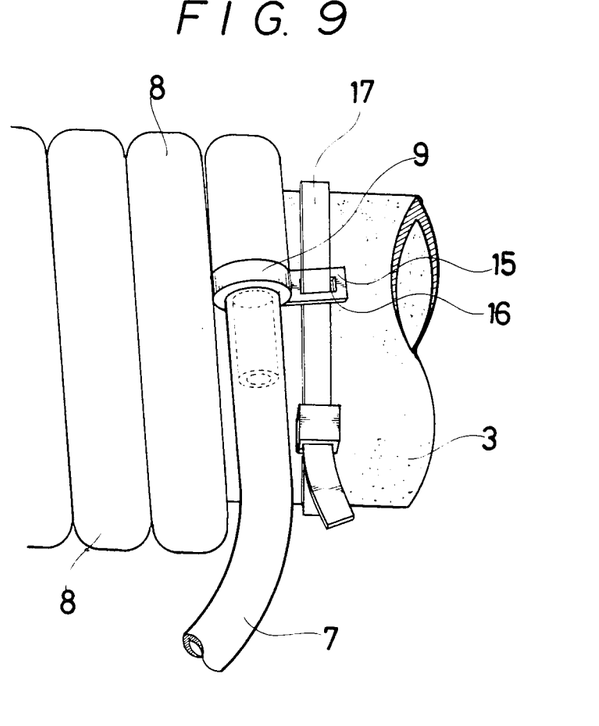

Another example of a coupling 9 is shown in FIG. 9, which has an ear 15 projecting from the side of the coupling. The ear 15 has a small slit 16. A tie belt 17 passes through the slit 16 and winds around the cooling water circulating hose 3. Preferably, both ends of the heat exchanger tube 8 are fixed by tie belts 17 in the manner shown in FIG. 9. Couplings 9 having ears 15 serve the dual functions of connecting washer liquid hose 7 to heat exchanger tube 8 and securing heat exchanger tube 8 to engine coolant hose 3.

A great advantage of the invention is the ease with which an embodiment of the invention can be installed under the hood of an already assembled car. In one method of installation, depicted in FIG. 6, a previously coiled heat exchanger tube 8 initially held above the coolant hose 3 is wound around hose 3 in a direction indicated by the arrow. The heat exchanger tube 8 tightly adheres to the outer surface of the hose 3 by virtue of an elastic force exerted by the previously coiled tube 8.

Because the tube 8 has a tendency to contract into a coil, the free ends of the tube 8 do not dangle. As the tube 8 is wound around on the cooling water circulating hose 3, neither free end of tube 8 interferes with the winding operation. In FIG. 6, tube 8 is half-wound. The couplings 9 may be affixed to both ends of the tube 8 either before or after the tube 8 is wound on the hose 3.

After installation of the heat exchanger tube 8 on the hose 3, the washer liquid hose 7 is severed and the two free ends are connected to the two couplings 9 on heat exchanger tube 8. In practice additional lengths of hose may be used to connect the heat exchanger tube 8 with the free ends of the washer liquid hose 7.

In a specific embodiment of the invention, an uncoiled heat exchanger tube 8 having an elongated circle cross-section as shown in FIG. 5 is first produced. The material of fabrication is 12 - nylon. The shorter inner diameter (corresponding to lengths KL or MN) is 6 mm. The longer inner diameter (corresponding to UW) is 9 mm. The cross-sectional area enclosed by the uncoiled tube is 46.3 mm$^2$. Such an uncoiled tube is wound into a coil on a cylindrical core. The coil's inner diameter is 40 mm after heating. When the coiled tube is cooled and the core removed, the tube is in a coil shape with 40 mm inner diameter. This coiled tube 8 is wound around a cooling water circulating hose 3 whose outer diameter is 50 mm.

The full uncoiled length of the tube 8 coil in this embodiment is about 1.5 m to 2 m. There are between 8 to 11 winding turns. Inner volume of the tube coil is 69 cm$^3$ if the full length of the tube is 1.5 m. The inner volume is 92 cm$^3$, if the length is 2 m.

For a tube 8 shaped into a coil having a 40 mm inner diameter, the coiled tube 8 can be readily wound around a hose 3 whose outer diameter is from 42 mm to 50 mm. The elastic force of the coiled tube 8 causes the coiled tube to hug the hose 3 strongly.

In one embodiment of the invention, the coiled tube 8 is fabricated from a suitable temperature responsive material such that when tube 8 is relatively cool when the engine is cool, tube 8 fits more strongly around hose 3 than when tube 8 is relatively warm when the engine is warm. In this way, greater contact between the tube 8 and the hose 3 is achieved when needed most—when the engine is relatively cool.

Experiment has shown that by employing an embodiment of the invention, the window washer liquid is effectively warmed. For example, in one instance, when the temperature of the washer liquid stored in the tank was 30° C., the temperature of the washer liquid warmed by am embodiment of the invention and ejected from the nozzles was 48° C. The washer liquid provided by the apparatus of the invention is not too hot. Such relatively mild warmth is desirable for improving the cleaning efficiency of window washer liquid.

Furthermore this invention is also available to warming for the head light washer liquid, if it is separated from the window washer apparatus.

By following the principles of the invention the following advantages are obtained. The construction is simple. Unlike prior art devices aforementioned, neither a double-walled tank nor a complex tank including a spiralled pipe therein is required. Installation is very simple. A pre-coiled heat exchanger tube 8 is wound onto the outer surface of the cooling water circulating hose 3 and is connected in line with the washer liquid hose 7. No added tank or heat exchanger is installed inside an engine cooling water circulating hose anywhere.

An apparatus made in accordance with the principles of the invention occupies only a small space under the hood of the motor vehicle. An apparatus of the invention requires few parts all of which are light in weight and readily attached to and supported by already installed elements under the motor vehicle hood. As a result it is not subjected to difficult problems in fixing and supporting added-on parts, a serious problem in all prior art washer liquid heating systems.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined by the following.

1. For a motor vehicle having a window washer system which includes a window washer liquid tank, a washer liquid pump, washer liquid hoses, and window nozzles, an apparatus for warming the window washer liquid, comprising:
   a flexible heat exchanger tube wound around an engine coolant circulation hose;
   coupling means for connecting said heat exchanger tube to the washer liquid hoses in line between the washer liquid pump and the window nozzles;
   wherein said coupling means is comprised of:
      a hose coupling element for connecting one end of said heat exchanger tube to a washer liquid hose;
      a tie belt for securing said heat exchanger tube and said coupling element to the engine coolant hose; and
      a slitted ear projecting from said coupling element for receiving said tie belt thereby securing said heat exchanger tube and said coupling element to the engine coolant hose.

\* \* \* \* \*